(12) United States Patent
Wiesner et al.

(10) Patent No.: US 10,274,152 B2
(45) Date of Patent: Apr. 30, 2019

(54) LIGHTING APPARATUS AND METHOD OF ALIGNMENT

(71) Applicant: Valeo North America, Inc., Troy, MI (US)

(72) Inventors: Tim Wiesner, Seymour, IN (US); Kevin Koons, Seymour, IN (US)

(73) Assignee: Valeo North America, Inc., Troy, MI (US)

(*) Notice: Subject to any disclaimer, the term of this patent is extended or adjusted under 35 U.S.C. 154(b) by 66 days.

(21) Appl. No.: 15/469,907

(22) Filed: Mar. 27, 2017

(65) Prior Publication Data

US 2018/0274747 A1 Sep. 27, 2018

(51) Int. Cl.
| | | |
|---|---|---|
| *F21V 9/00* | (2018.01) | |
| *F21S 41/24* | (2018.01) | |
| *F21S 41/14* | (2018.01) | |
| *F21S 43/235* | (2018.01) | |
| *G01M 11/06* | (2006.01) | |
| *F21S 43/20* | (2018.01) | |
| *F21S 8/06* | (2006.01) | |
| *B60Q 1/00* | (2006.01) | |
| *F21S 43/27* | (2018.01) | |

(52) U.S. Cl.
CPC ............ *F21S 41/24* (2018.01); *B60Q 1/0011* (2013.01); *F21S 8/06* (2013.01); *F21S 41/14* (2018.01); *F21S 43/235* (2018.01); *F21S 43/255* (2018.01); *F21S 43/27* (2018.01); *G01M 11/067* (2013.01)

(58) Field of Classification Search
CPC .................... B60Q 1/0011; F21S 41/24; F21S 43/235–43/251
See application file for complete search history.

(56) References Cited

U.S. PATENT DOCUMENTS

2016/0207444 A1* 7/2016 Tatara ..................... B60R 11/04
2017/0268741 A1* 9/2017 Happy .................. F21S 43/245

* cited by examiner

*Primary Examiner* — Sean P Gramling
(74) *Attorney, Agent, or Firm* — Oblon, McClelland, Maier & Neustadt, L.L.P.

(57) ABSTRACT

The present disclosure discusses a lighting apparatus. The lighting apparatus includes a housing with a fastening fixture and a pivot fixture, a light bar including a first arm, a second arm and a third arm with an optical marking, and a light guide including a light pipe, a pivot hole, a first slot and a second slot located between the housing and the light bar, wherein the optical marking of the light bar is aligned with the light pipe of the light guide by rotating the light guide and the first arm about the pivot hole and the light bar is fastened to the housing.

14 Claims, 10 Drawing Sheets

LIGHTING APPARATUS AND METHOD OF ALIGNMENT

BACKGROUND

Description of the Related Art

A lighting apparatus such as a head light includes components that are typically manufactured by molding process from plastic like material. Such materials are susceptible to warping and deformation after the molding. Furthermore, the materials harden and are difficult to manipulate after hardening.

The components of the lighting apparatus must be aligned correctly to satisfy the optical specification of the lighting. However, it can be challenging due to the warping effect. Thus, an efficient way to assemble the components is necessary.

SUMMARY

According to an embodiment of the present disclosure, there is provided a lighting apparatus. The lighting apparatus includes a housing with a fastening fixture and a pivot fixture, a light bar including a first arm, a second arm and a third arm with an optical marking, and a light guide including a light pipe, a pivot hole, a first slot and a second slot located between the housing and the light bar, wherein the optical marking of the light bar is aligned with the light pipe of the light guide by rotating the light guide and the first arm about the pivot hole and the light bar is fastened to the housing.

The fastening fixture of the housing is an internally threaded hollow shaft integrally formed with the housing. The pivot fixture of the housing is a solid shaft integrally formed with the housing. The light bar is U-shaped.

The first arm of the light bar includes a first slot formed perpendicular to a length of the first arm. The first arm of the light bar includes a locator. The locator of the first arm has a wedge-like shape. The light guide includes a locator pocket that mates with a locator of the light bar. The pivot hole receives the pivot fixture of the housing. The first slot and the second slot of the light guide receive the fastening fixture of the housing. The light guide rotates about the pivot hole at an angle between −10° to 10°.

Further, according to an embodiment of the present disclosure, there is provided a method for assembling a lighting apparatus. The method includes providing a housing including a fastening fixture and a pivot fixture, providing a light guide including a locator pocket, a pivot hole, a first slot and a second slot, aligning the pivot fixture of the housing and the pivot hole of the light guide, assembling the housing and the light guide, providing a light bar having a first arm, a second arm, and a third arm and including a first slot and a locator, aligning light bar over the light guide and the housing, fixing the second arm, and the third arm of the light bar to the housing via the fastening fixture of the housing, adjusting the light bar at the first arm by rotating the first arm of the light guide and the light bar about the pivot hole, and fixing the light bar at the first arm to the housing via the fastening fixture.

The aligning of the light bar includes placing the locator of the light bar in the locator pocket of the light guide. The rotation of the first arm of the light bar is in the range between −10° to 10°.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Figure 1:
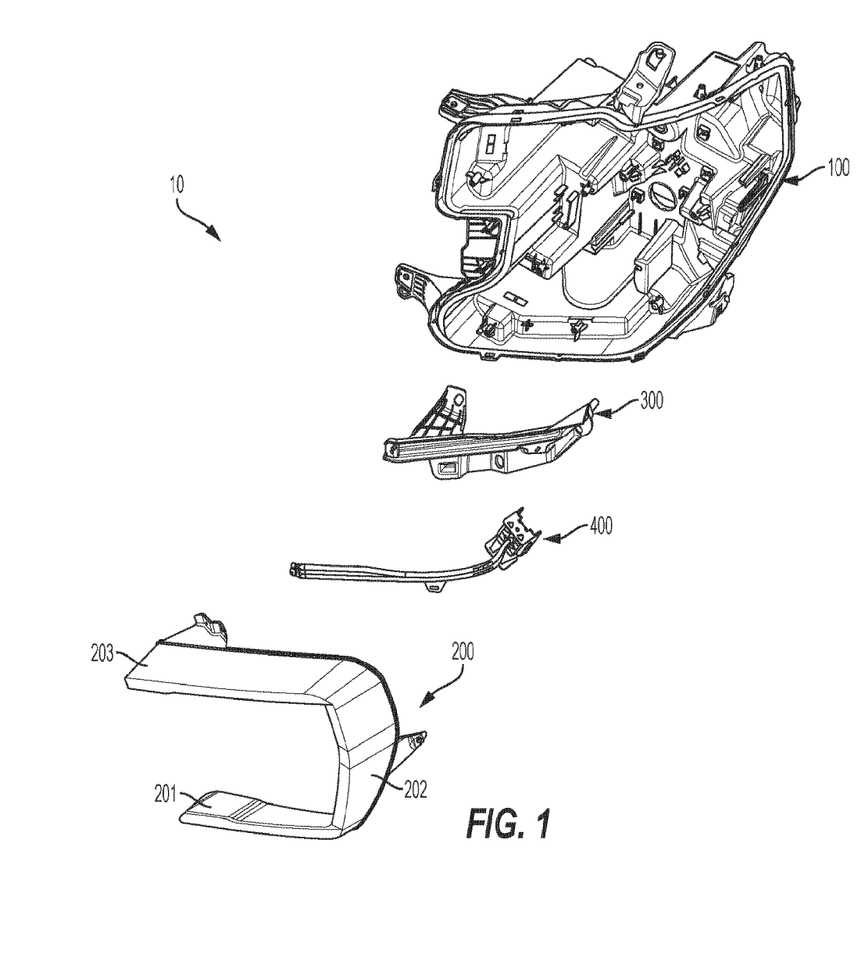
FIG. 1 is an exploded view a lighting apparatus according to an embodiment of the present disclosure.

FIG. 1 is an exploded view a lighting apparatus 10 according to an embodiment of the present disclosure. The lighting apparatus 10 includes a housing 100, a light bar 200 and a light guide 300. The lighting apparatus 10 can further include additional components such as a light pipe 400. The housing 100, the light bar 200, the light guide 300, the light pipe 400 and other components (not illustrated) are assembled to form a lighting apparatus 10. The lighting apparatus 10 can be any device that provides lighting and/or optical feature for an automobile. For example, the lighting apparatus 10 can be a headlight.

The housing 100 is a cover supporting different components of the lighting apparatus 10. The housing 100 can be a hollow profiled box that provides fastening and pivoting fixtures (not illustrated) such as an internally threaded shaft, pivot points, etc. for attaching different components to form a lighting apparatus 10. The housing 100 has a complex structure and is manufactured using casting or molding using a one-shot or a two-shot injection molding process.

The light bar 200 is a U-shaped component having a first arm 201, a second arm 202 and a third arm 203. The light bar 200 includes fixtures to attach the light bar 200 to the housing 100 in a fixed manner. The light bar 200 can be manufactured using a two-shot molding process. After completion of the molding process, the light bar 200 can cool down and become hard with low flexibility. As such, the light bar 200 can be very difficult to align with other optical components such as a light pipe. Furthermore, the light bar 200 is a large component that warps after the molding process may further warp during an assembly process. It is difficult to control the warping of such large components that makes assembly of the light bar 200 a challenging and difficult task. Typically, the light bar 200 is fixed to the housing 100 by fastening the first arm 201, the second arm 202 and the third arm 203 simultaneously.

However, before fixing the light bar 200, optical markings 221, 222 and 223 (illustrated in FIG. 2B) of the light bar 200 should be properly aligned with the light pipe 400 and a light guide support (e.g., the light guide 300) that is placed under each arm 201, 202, and 203, respectively. The alignment of the light bar 200 with the light guide 300 ensures that the optical properties such as intensity, sharpness of the lighting apparatus 10 are met or preserved. If the optical properties are not satisfied, the lighting apparatus 10 may not meet the regulatory specifications and may lead to re-manufacturing and/or re-assembly of lighting apparatus 10, which can be very expensive and time consuming.

The light guide 300 is an elongated component with a profiled shape. The light guide 300 provides support to the light pipe 400 and the light bar 200. The light pipe 400 can be laid longitudinally in the light guide 300. The light guide 300 is typically fixed to the housing 100 under the light bar 200. Components similar to the light guide 300 can also be included to support all the arms of the light bar 200 and the light pipe 400. The light projecting from the light pipe 400 interacts with the optical markings of the light bar 200 to create a desired optical effect. If the light pipe 400 is misaligned with respect to the optical marking of the light bar 200, the desired optical effect is distorted.

The housing 100, the light bar 200 and the light guide 300 can be made from, but not limited to, plastic, or other moldable materials. Further, it can be understood that the light bar 200 is not limited to the above manufacturing process and can be manufactured using other processes such as one-shot molding, or casting.

Figure 2A:
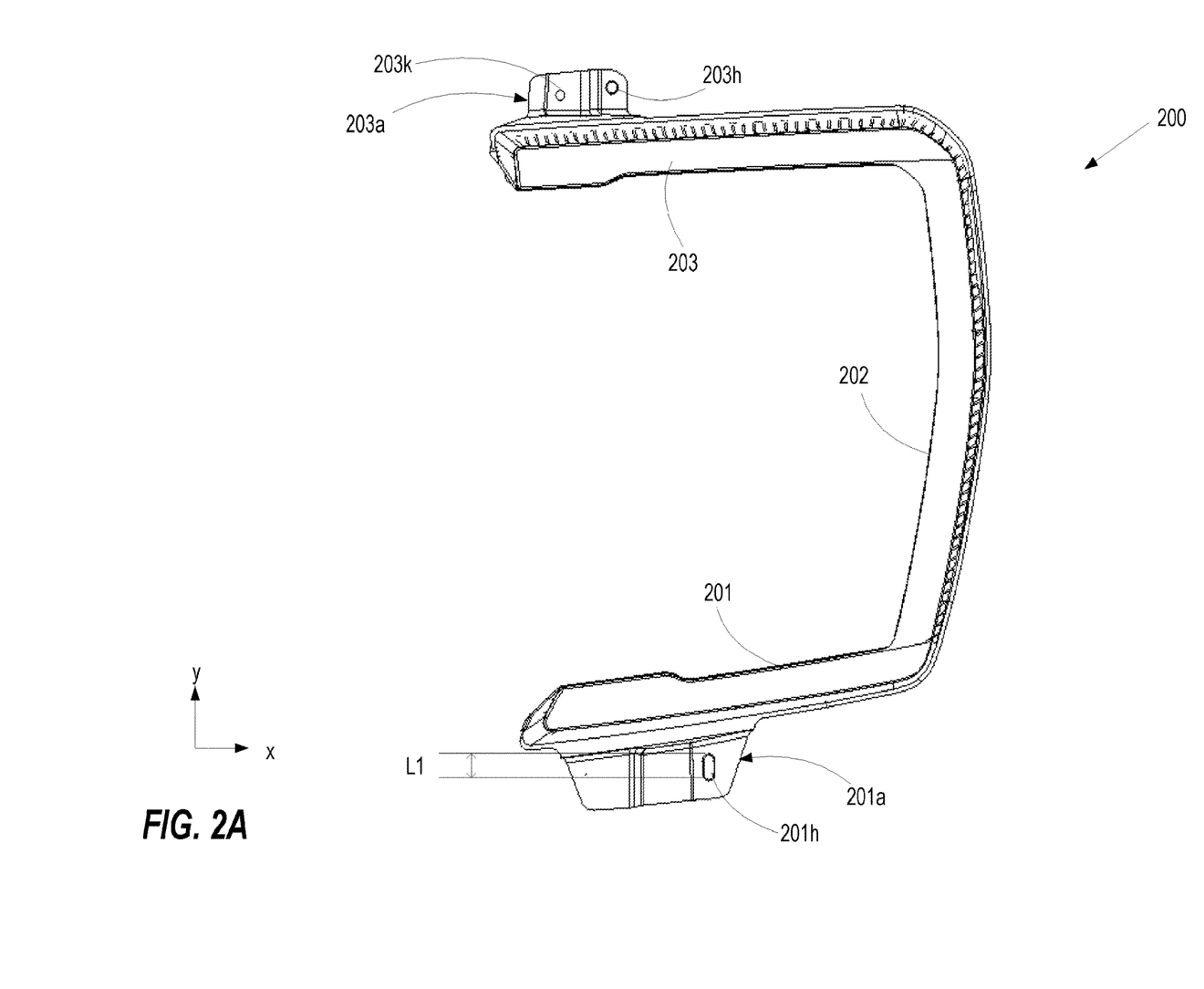
FIG. 2A illustrates a light bar of the lighting apparatus according to an embodiment of the present disclosure.
Figure 2B:
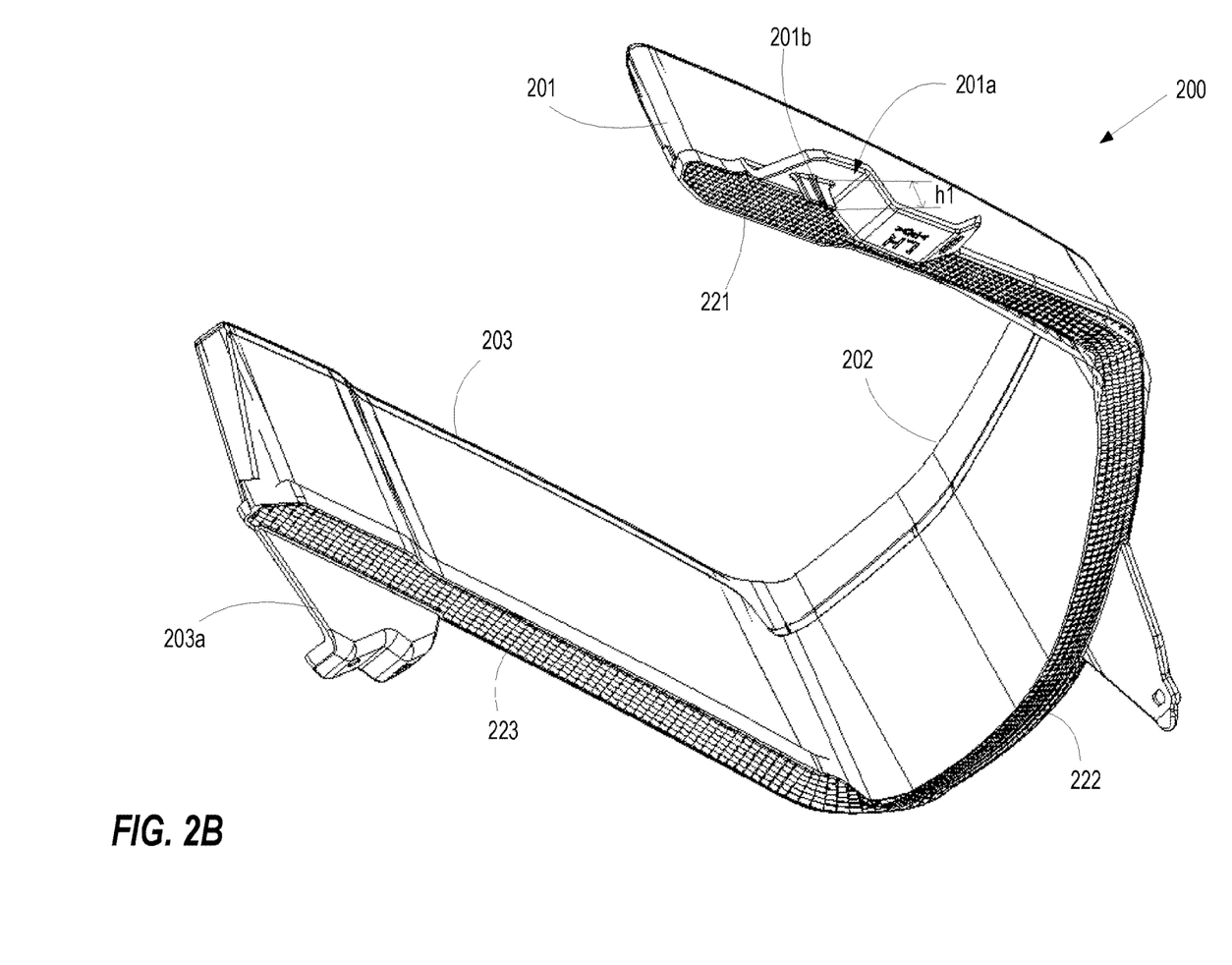
FIG. 2B is a perspective view of the light bar of FIG. 2A according to an embodiment of the present disclosure.

FIG. 2A is a front view and FIG. 2B is a perspective view of the light bar 200 of the lighting apparatus 10 according to an embodiment of the present disclosure. In FIG. 2A, light bar 200 is U-shaped with the first arm 201, the second arm 202, and the third arm 203 forming a unitary construction. The arms 201, 202 and 203 include fixtures that enable positioning and attachment of the light bar 200 to the housing 100 and the light guide 300 (not illustrated). The light bar 200 also includes the optical markings 221, 222, and 223 formed in a continuous manner along the U-shape, as illustrated in FIG. 2B.

In FIG. 2A, the first arm 201 includes a first fixture 201a that serves as an attaching means to the housing 100 and the light guide 300. The first fixture 201a includes a first slot 201h that can receive a shaft, a screw or other fasteners. The first slot 201h is approximately perpendicular to the first arm 201. The first slot 201h has a length L1. The first slot 201h provides for adjustment of the first arm 201 along a y-direction, thus allowing substantial adjustment for alignment purposes and to compensate for warping effect.

As shown in FIG. 2B, the first fixture 201a also includes a locater 201b that allows positioning of the light bar 200 with the light guide 300 (not illustrated). The locater 201b can have a wedge like shape. The locater 201b has a height h1 and projects downwards.

Referring back to FIG. 2A, the third arm 203 includes a second fixture 203a that serves as an attaching means to the housing 100 and a light guide support (that can be different from the light guide 300). The second fixture 203a includes holes 203h and 203k that can receive a screw or other fasteners. The use of holes 203h and 203k prevents movement of the third arm 203 along the y-direction or x-direction.

Similarly, the second arm 202 includes fixtures (not illustrated) to fix the second arm 203 to the housing 200 and a light guide support (different from the light guide 300) in a fixed manner.

Thus, the light bar 200 can be fixed at two arms 202 and 203 to prevent movement of the light bar 200 that may be caused due to warping and affect the alignment with respect to the light pipe. Also, after fixing the arm 202 and 203, the arms 202 and 203 may not allow substantial adjustment for alignment purposes. As such, the warping effect is transferred to the first arm 201 and the first slot 201h of the first arm 201 allows to compensate for such warping effect.

Figure 3A:
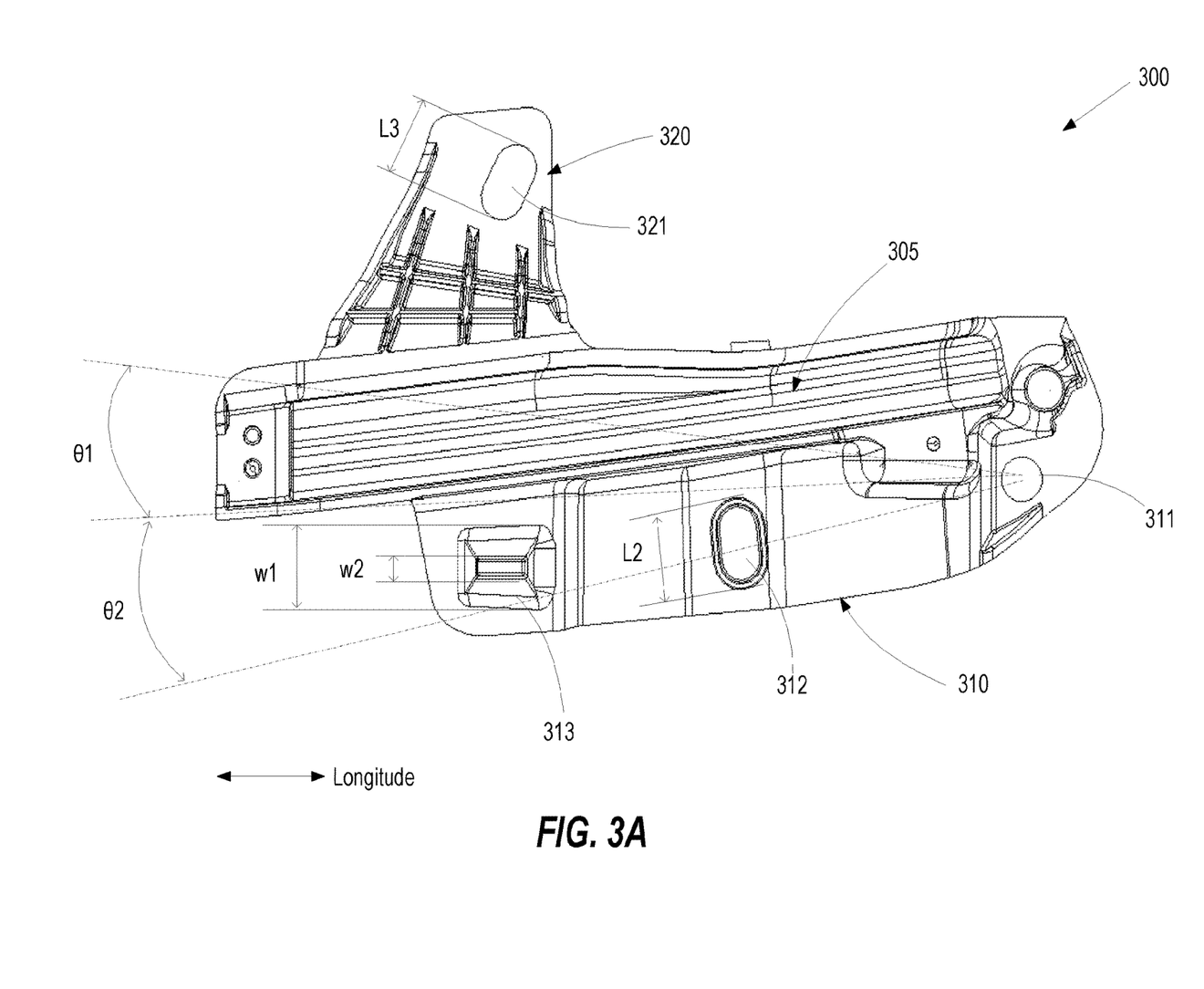
FIG. 3A is a front view of a light guide according to an embodiment of the present disclosure.
Figure 3B:
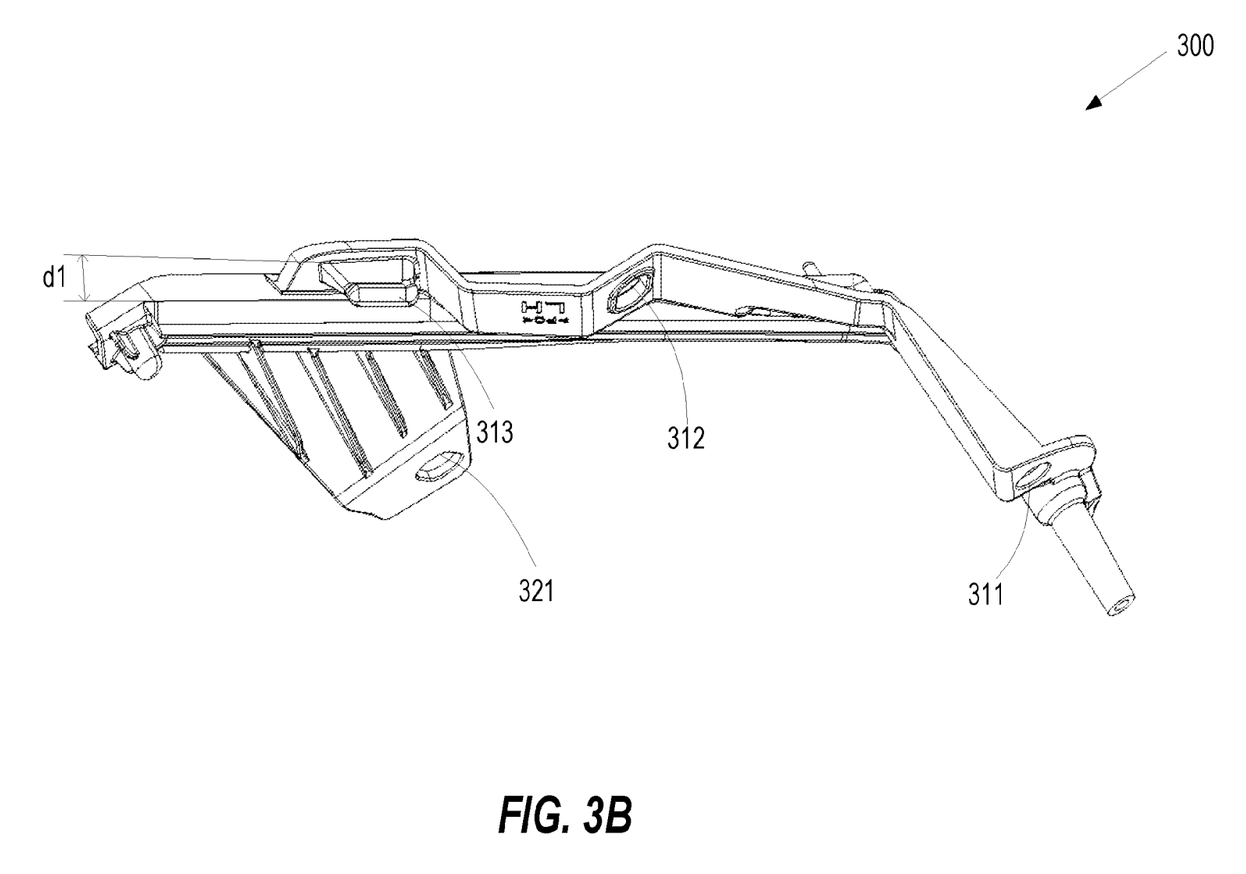
FIG. 3B is a perspective view of the light guide according to an embodiment of the present disclosure.

FIGS. 3A and 3B are a front view and a perspective view, respectively, of the light guide 300 according to an embodiment of the present disclosure. The light guide 300 includes a first wing 310 and a second wing 320 and a light pipe channel 305. The first wing 310 and the second wing 320 serve as fixtures as well as define a range of rotation of the light guide 300. The first wing 310 and the second wing 320 can have a profiled shape, as shown in FIG. 3B. The profile shape conforms to the housing 100 (not illustrated).

The first wing 310 includes a pivot hole 311, a first slot 312, and a locator pocket 313. The pivot hole 311 is located at a proximal end (right side), the first slot 312 is located approximately at a center, and the locator pocket 313 located at a distal end (left side).

The pivot hole 311 is a circular hole that can receive a pivot shaft of the housing 100 (not illustrated). The pivot hole 311 allows the light guide 300 to rotate about the pivot hole 311. The pivot hole 311 can also serve as a reference for positioning and/or assembling the light guide 300 with respect to the housing 100.

The first slot 312 is a rounded rectangular slot disposed approximately perpendicular to the longitude of the light guide 300. The first slot 312 can receive a shaft, a screw, rivet or other fasteners that further connects to the housing 100. The first slot 312 can be of length L2. The first slot 312 can define the range of rotation of the light guide 300. The first slot 312 can allow and/or restrict the rotation of the light guide 300 when rotated about the pivot hole 311. For example, the first slot 312 can restrict the rotation of the light guide 300 to a first angle $\theta_1$ in clockwise direction and a second angle $\theta_2$ in counter clockwise direction. For example, the rotation can be in the range −10° to 10°. Thus, the range of the rotation can be an angle $\theta$, a sum of the first and the second angle, for example, the angle $\theta$ can be 20°.

The first wing 310 also includes the locator pocket 313 at the distal end. The locator pocket 313 is open at one end and closed at the other. The locator pocket 313 has a funnel like shape where width decreases gradually from a width w1 at the opening to a width w2 at the base. The height of the locator pocket 313 can be h2 (in FIG. 3B). The locator pocket 313 receives the locator 210 (in FIG. 2B) of the light bar 200. The wedge like shape of the locator 210 and the funnel like shape of the locator pocket 313 allow smooth mating of the respective parts as well as provide tolerance for positioning inaccuracies and/or offsets.

The second wing 320 includes a second slot 321 at a distal end (top side) of the second wing 320. The second slot 321 is a rounded rectangular slot disposed at an angle with respect to the longitudinal axis of the light guide 300. The second slot 321 can receive a shaft, a screw, rivet or other fasteners that further connects to the housing 100. The second slot 321 can be of length L3. Similar to the first slot 312, the second slot 321 can define the range of rotation of the light guide 300. The second slot 321 can allow and/or restrict the rotation of the light guide 300 when rotated about the pivot hole 311.

The light pipe channel 305 is formed between the first wing 310 and the second wing 320 along a longitudinal axis of the light guide 300. The light pipe channel 305 supports the light pipe 400 (not illustrated).

Figure 4A:
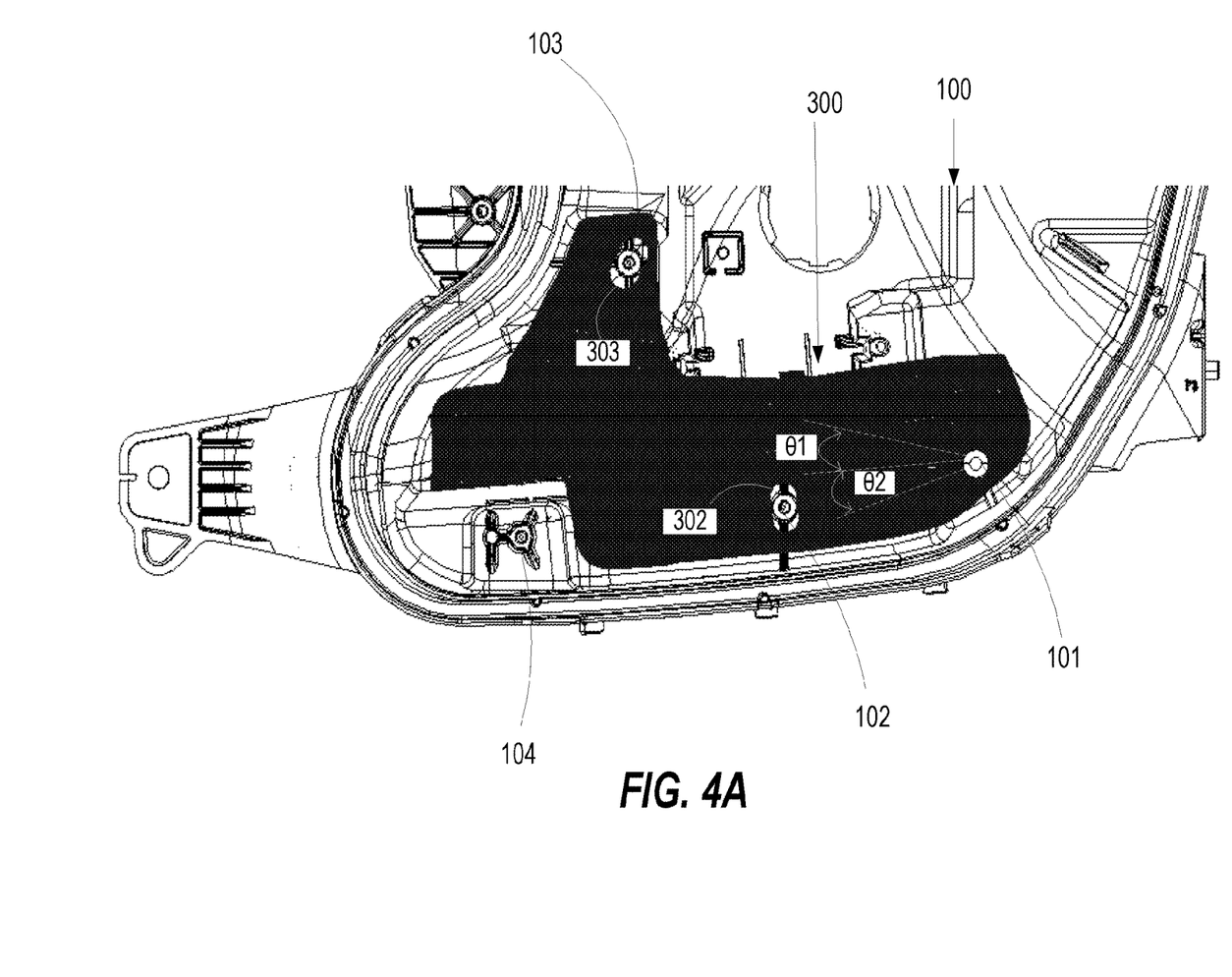
FIG. 4A is an assembly of a housing and the light guide according to an embodiment of the present disclosure.
Figure 4B:
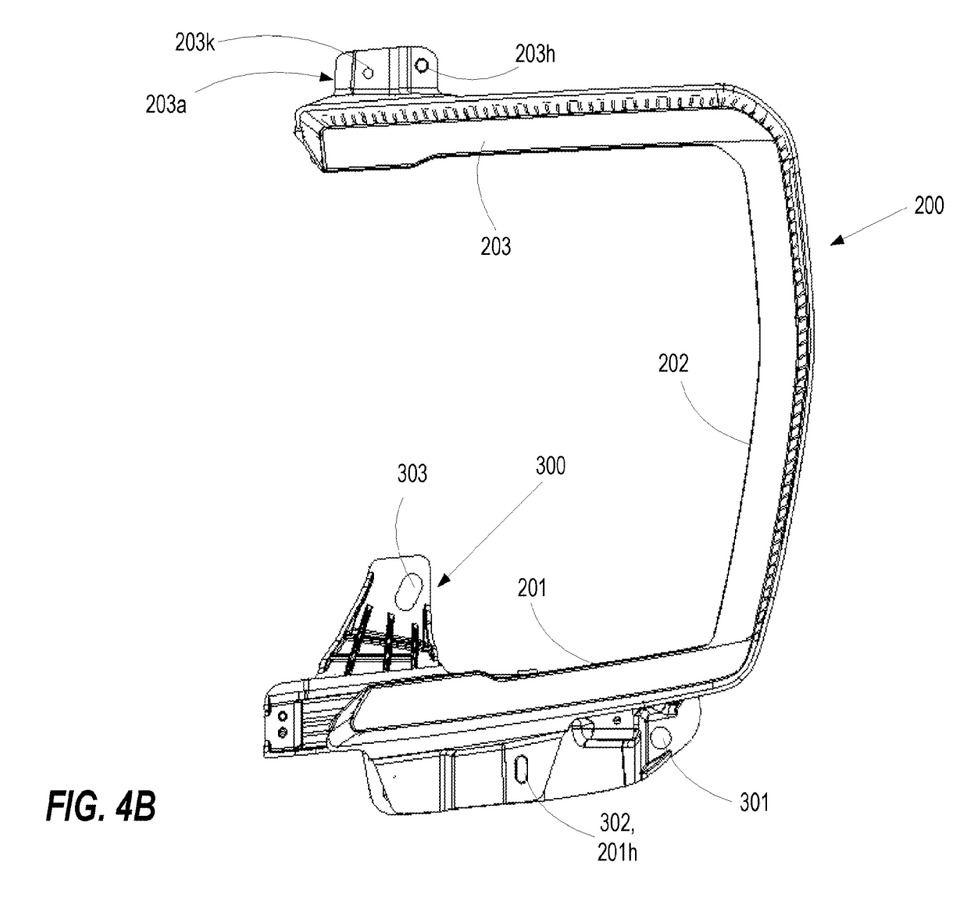
FIG. 4B is a front view of an assembly of the light bar and a light guide according to an embodiment of the present disclosure.
Figure 4C:
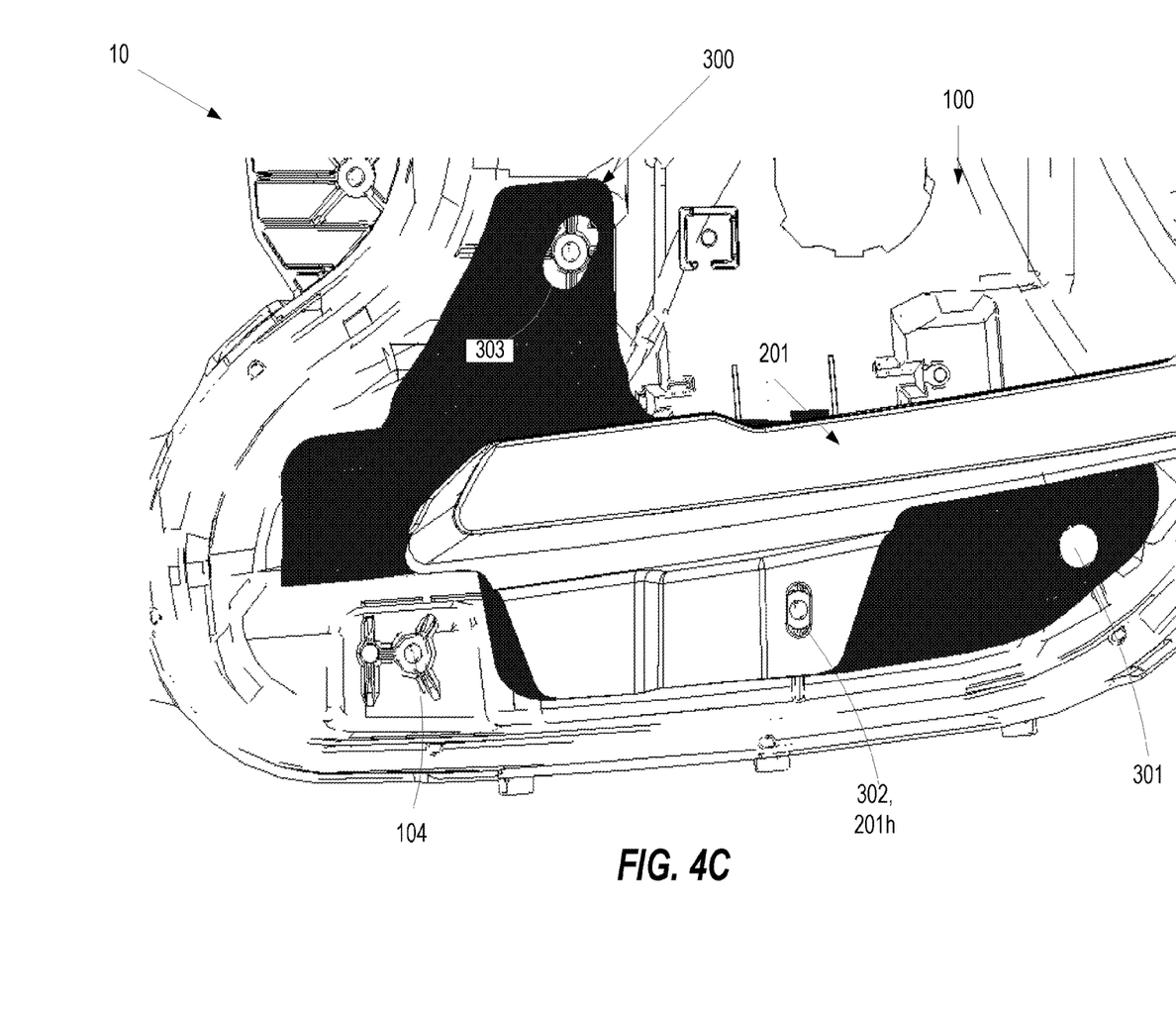
FIG. 4C is a front view of the lighting apparatus according to an embodiment of the present disclosure.

The components including the housing 100, the light bar 200, the light guide 300 and the light pipe 400 are assembled to form the lighting apparatus 10. FIGS. 4A, 4B, and 4C illustrate the assembly process of the lighting apparatus 10 according to an embodiment of the present disclosure.

Figure 5:
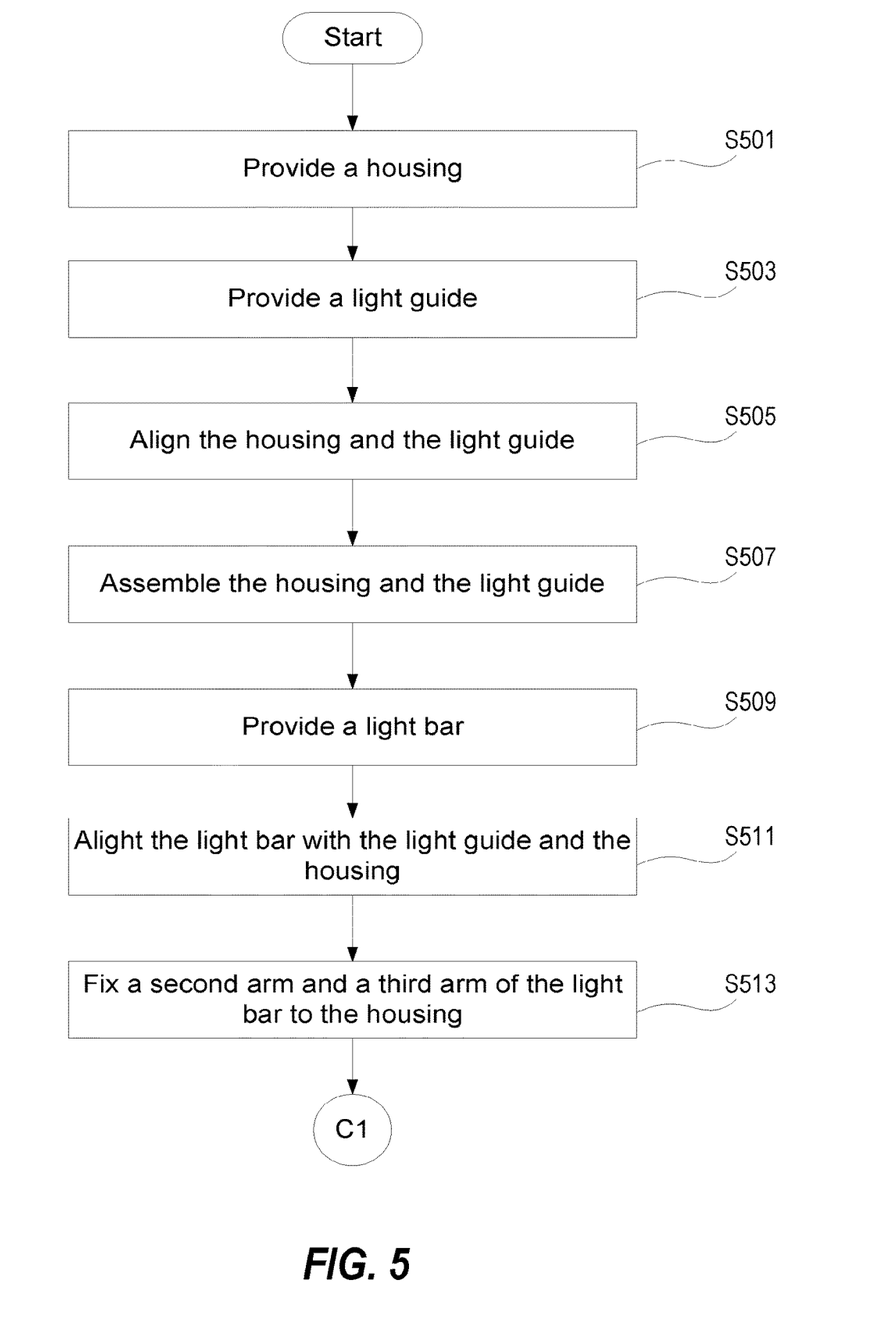
FIG. 5 is a method of assembly of the lighting apparatus according to an embodiment of the present disclosure.

FIG. 5 is a method of assembly of the lighting apparatus 10 according to an embodiment of the present disclosure. The assembly process starts when the components of the lighting apparatus 10 including the housing 100, the light guide 300 and the light pipe 400 are manufactured and the light bar 200 is transported from the injection molding machine.

In step S501, the housing 100 that includes a pivoting and fastening fixtures is provided. For example, referring to FIG. 4A, the housing 100 includes a pivoting fixture 101 and fastening fixtures 102, 103, and 104. The pivoting fixture 101 can be a shaft (also referred as pivoting shaft) that is integrally formed in the housing 100. The fastening fixtures 102, 103, and 104 can be an internally threaded hollow shaft integrally formed in the housing 100. The housing 100 can be pre-manufactured or transported directly from the injection molding machine via conveyor or similar transporting mechanisms.

In step S503, the light guide 300 that includes the pivot hole 301, the first slot 302, the second slot 303, and the locator pocket 304 is provided. The light guide 300 is installed with the light pipe 400. The light guide 300 can be pre-manufactured or transported directly from the injection molding machine via conveyor or similar transporting mechanisms.

In step S505, the pivot fixture 101 of the housing 100 and the pivot hole 301 of the light guide 300 are aligned. Further, the fastening fixtures 102 and 103 can be aligned with the first slot 302 and the second slot 303, respectively.

In step S507, the housing 100 and the light guide 300 are assembled. FIG. 4A illustrates an example assembly of the housing 100 and the light guide 300.

In step S509, the light bar 200 with holes 203h and 203k is provided. The light bar 200 is transported from the injection molding machine and is in the cooling phase. While transporting, the light bar 200 can warp and/or shrink during the cooling phase.

In step S511, the light bar 200 is aligned with the light guide 300 and the housing 100, such that the optical markings 221, 222, and 223 receive light from the light pipe. The light bar 200 can be aligned, for example, by inserting the locator 210 of the light bar 200 in the locator pocket 313 of the light guide 300. Furthermore, the first slot 201h, the holes 203h and 203k of light bar 200 can be aligned with corresponding fixtures of the housing 100. FIG. 4B illustrate a front view of an assembly of the light bar and a light guide according to an embodiment of the present disclosure.

In step S513, the second arm 202, and the third arm 203 of the light bar 200 is fixed to the housing 100. As such, the arms 202 and 203 cannot be moved to adjust for warping effect.

In step S515, the first arm 201 of the light bar 200 is adjusted by rotating the light guide 300 about the pivot hole 301. FIG. 4C is a front view of the lighting apparatus according to an embodiment of the present disclosure;

In step S517, the first arm 201 of the light bar 200 is fixed to the housing 100, for example, by driving a screw through the fixture 101 and 102.

The above process has several advantages over conventional assembly process, where all the arms of the light bar are fixed simultaneously. For example, the process of the present disclosure can account for warping effect by rotating the first arm and the light guide, thus providing optical alignment, positional flexibility and ease of assembly.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A lighting apparatus, comprising:
   a housing with a fastening fixture and a pivot fixture;
   a light bar including a first arm, a second arm and a third arm with an optical marking; and
   a light guide including a light pipe, a pivot hole, a first slot and a second slot located between the housing and the light bar, wherein the optical marking of the light bar is aligned with the light pipe of the light guide by rotating the light guide about the pivot hole and the light bar is fastened to the housing.

2. The lighting apparatus according to claim 1, wherein the fastening fixture of the housing is an internally threaded hollow shaft integrally formed with the housing.

3. The lighting apparatus according to claim 1, wherein the pivot fixture of the housing is a solid shaft integrally formed with the housing.

4. The lighting apparatus according to claim 1, wherein the light bar is U-shaped.

5. The lighting apparatus according to claim 1, wherein the first arm of the light bar includes a first slot formed perpendicular to a length of the first arm.

6. The lighting apparatus according to claim 1, wherein the first arm of the light bar includes locator.

7. The lighting apparatus according to claim 6, wherein the locator of the first arm has a wedge-like shape.

8. The lighting apparatus according to claim 1, wherein the light guide includes a locator pocket that mates with a locator of the light bar.

9. The lighting apparatus according to claim 1, wherein the pivot hole receives the pivot fixture of the housing.

10. The lighting apparatus according to claim 1, wherein the first slot and the second slot of the light guide receives the fastening fixture of the housing.

11. The lighting apparatus according to claim 1, wherein the light guide rotates about the pivot hole at an angle between −10° to 10°.

12. A method for assembling a lighting apparatus that includes a housing including a fastening fixture and a pivot fixture, a light guide including a locator pocket, a pivot hole, a first slot and a second slot, and a light bar having a first arm, a second arm, and a third arm and including a first slot and a locator, the method comprising:
   aligning the pivot fixture of the housing and the pivot hole of the light guide;
   assembling the housing and the light guide;
   aligning the light bar over the light guide and the housing;
   fixing the second arm and the third arm of the light bar to the housing via the fastening fixture of the housing;
   adjusting the light bar at the first arm by rotating the light guide about the pivot hole; and
   fixing the light bar at the first arm to the housing via the fastening fixture.

13. The method according to the claim 12, wherein the aligning of the light bar includes placing the locator of the light bar in the locator pocket of the light guide.

14. The method according to the claim 12, wherein the rotation of the light guide is in the range between −10° to 10°.

* * * * *